United States Patent [19]

Mueller, Jr.

[11] 4,082,318
[45] Apr. 4, 1978

[54] HYDRAULIC CONNECTION AND METHOD

[75] Inventor: Otto Mueller, Jr., Detroit, Mich.

[73] Assignee: Massey-Ferguson Inc., Detroit, Mich.

[21] Appl. No.: 713,180

[22] Filed: Aug. 10, 1976

[51] Int. Cl.² .................................................. F16L 35/00
[52] U.S. Cl. ...................................... 285/19; 29/157 R; 29/450; 285/347
[58] Field of Search ................... 285/347, 31, 32, 18, 285/19, 20, 62, 64; 29/157 R, 450

[56] References Cited

U.S. PATENT DOCUMENTS

| | | | |
|---|---|---|---|
| 1,299,042 | 4/1919 | Schepmoes | 285/31 X |
| 1,559,706 | 11/1925 | Jennings | 285/31 X |
| 2,359,846 | 10/1944 | Hayman | 285/32 |
| 2,484,755 | 10/1949 | Smith | 285/32 X |

FOREIGN PATENT DOCUMENTS

| | | | |
|---|---|---|---|
| 765,857 | 3/1934 | France | 285/19 |
| 778,365 | 7/1957 | United Kingdom | 285/19 |

Primary Examiner—Dave W. Arola
Attorney, Agent, or Firm—John C. Thompson

[57] ABSTRACT

A hydraulic connection for establishing a fluid connection between a hydraulic unit mounted within a housing and a fluid line which terminates outside of the housing. The housing is provided with a threaded aperture in line with a cylindrical recess on the hydraulic unit which is in communication with a port. One end of a standpipe, having O-rings at either end, is inserted in the cylindrical recess of the hydraulic unit. A counterbored threaded fitting is screwed into the aperture, the counterbore receiving the other end of the standpipe. A fluid line is connected to the fitting.

8 Claims, 3 Drawing Figures

HYDRAULIC CONNECTION AND METHOD

The present invention relates generally to fluid connectors and a method for establishing a fluid connection, and more particularly to a method and apparatus for establishing a fluid connection between a hydraulic unit mounted within a housing and a fluid line which terminates outside of the housing. In the embodiment illustrated in this application the hydraulic unit is a valve block which is employed to direct fluid flow to and from a pair of lift cylinders on a tractor, the valve block being mounted within a removable cover of a housing, and the fluid lines connected with the valve block extending to a pump or to the lift cylinders.

It is conventional in tractor design to provide a control valve for raising and lowering the lift cylinders of a three point implement hitch. Such valves are customarily disposed within a housing which also contains the fluid reservoir so that fluid lines from the valve body to the reservoir need not be provided. It is also conventional to mount the hydraulic pump within the reservoir area and connect a line from the pump to the valve. The fluid lines which extend from the valve to the lift cylinders may be either connected directly to the valve within the casing, in which case it is necessary to provide seals where the fluid lines pass through the housing, or alternatively the valve body may be provided with surface ports which are aligned with corresponding surface ports in the housing, the fluid line being connected to such ports in the housing. In order to facilitate servicing of the control valve and the various control linkages which actuate the control valve it has been proposed to mount the valve on a removable cover plate of the housing. As the line from the pump and the lines to the lift cylinders are at least in part disposed outside of the housing it is necessary to provide a manner wherein the line can be easily connected and disconnected from the valve body.

Therefore, it is an object of the present invention to provide an improved hydraulic connection which can be readily assembled and disassembled.

It is a further object of the present invention to provide a hydraulic connection between a hydraulic unit mounted within a housing and a fluid line which terminates outside of the housing which connection can be easily established and wherein it is not necessary to provide additional sealing structure between the housing wall and the conduit which transmits the fluid through the housing wall.

More specifically, it is an object of the present invention to provide a hydraulic connection in combination with a ported valve body mounted within a housing and a fluid line which terminates outside the housing, the valve body being provided with a cylindrical recess, and the housing being provided with a threaded aperture, the connection including a threaded fitting received within the aperture, the threaded fitting having a cylindrical recess, and a standpipe having 0-rings at either end, one end of the standpipe being received within the cylindrical recess of the valve body, and the other end of the standpipe being received within the cylindrical recess of the fitting.

It is a still further object of the present invention to provide a method for establishing a fluid connection between a port in an hydraulic unit secured within a housing and a fluid line which terminates outside of said housing, the method including providing a standpipe having O-rings at either end, inserting one end of the standpipe into a counterbored portion of the valve body, and threading a fitting into an aperture, the fitting being provided with another counterbore which receives the other end of the standpipe.

These and other objects and advantages will be apparent to those skilled in the art after a consideration of the following detailed description taken in conjunction with the accompanying drawing in which a preferred form of this invention is illustrated.

Figure 1:
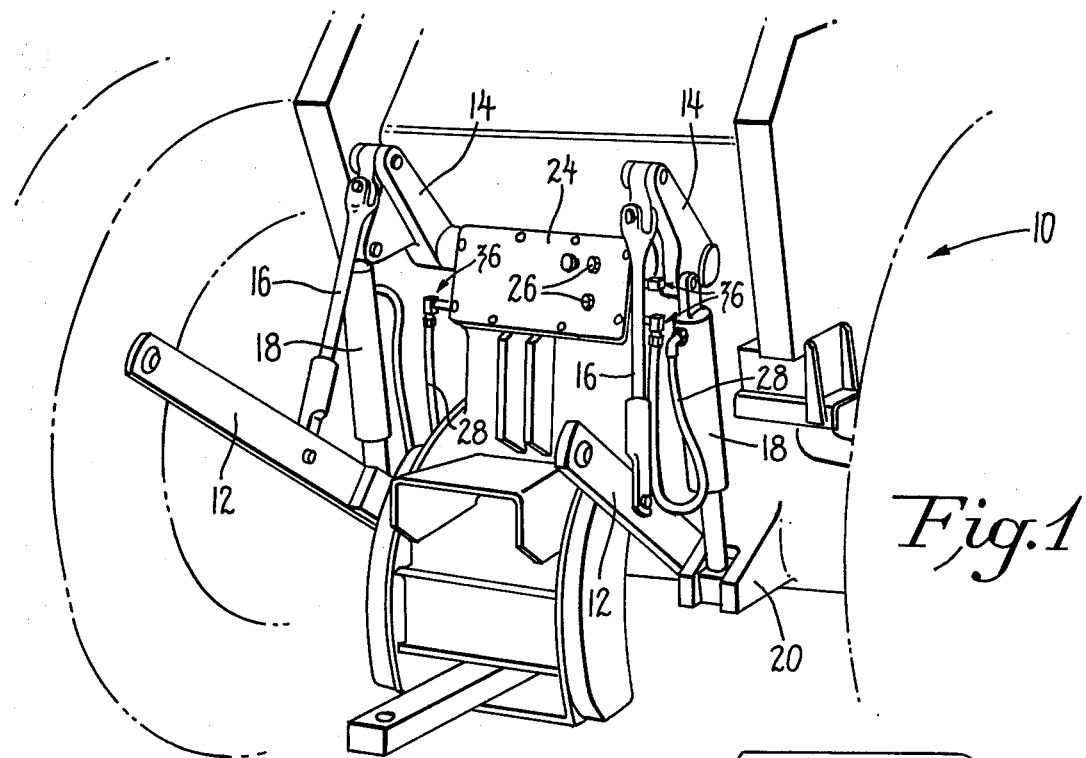
FIG. 1 is a somewhat schematic rear perspective view of a portion of a tractor in which the principles of the present invention have been incorporated.

Referring first to FIG. 1, a portion of a tractor is illustrated, the tractor being generally indicated at 10. The tractor is provided with a three point implement hitch linkage which includes a pair of right and left hand draft links 12 each of which is interconnected with an associated lift arm 14 by a lift link 16. The lift arms are moved up and down hydraulic cylinders 18 one end of each being connected to suitable structure 20 on the tractor frame. The operation of the cylinders is controlled by a valve 22 mounted within a housing 24 by appropriate fasteners 26. The housing 24 is a cover plate which can be removed for servicing components in the interior of the housing. One end of each fluid line 28 is connected with a lift cylinder 18, and the other end is adapted to be interconnected with the valve 22 by the hydraulic connection of this invention. One end of a fluid line 30 is connected with a pump, the other end being adapted to be interconnected with the valve 22 also by the hydraulic connection of this invention.

Figure 2:
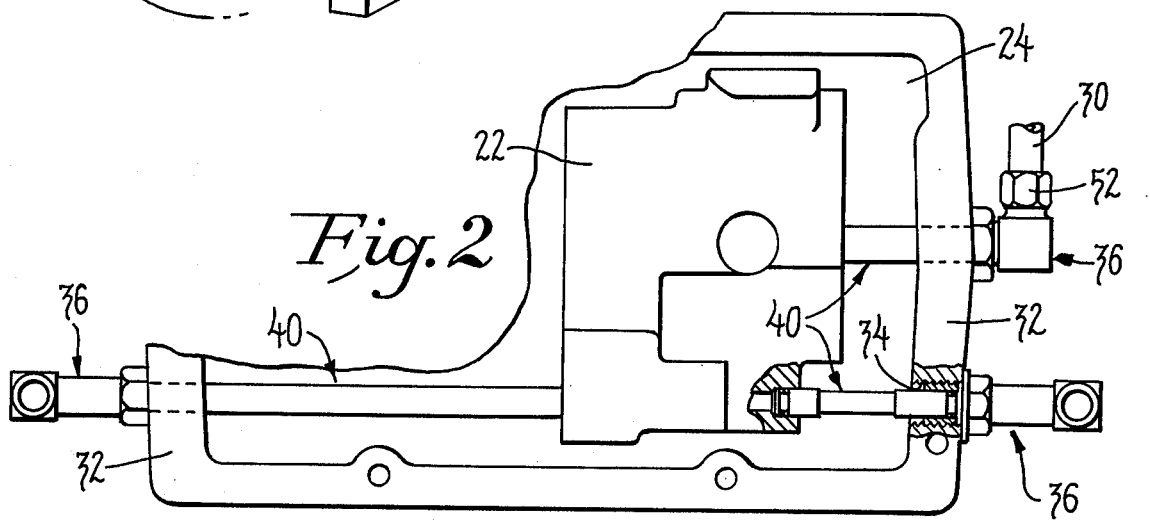
FIG. 2 is a view of the hydraulic connection between a portion of a housing and a valve body supported by the housing.
Figure 3:
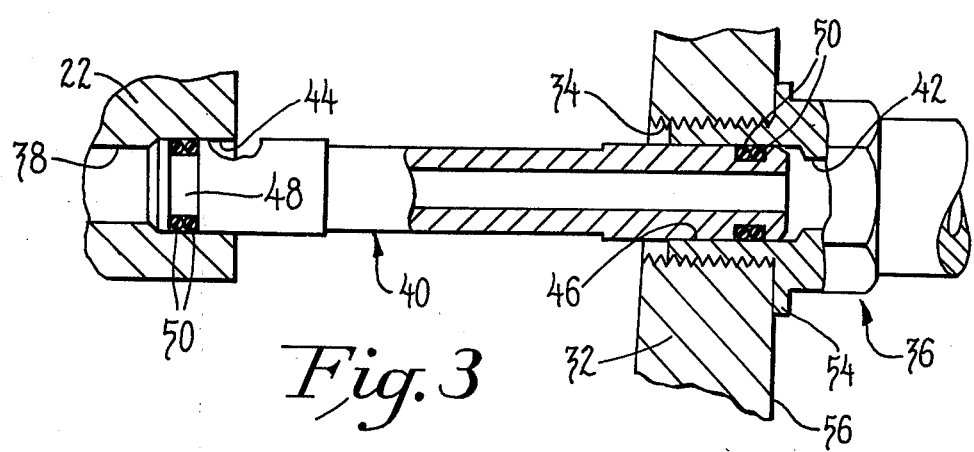
FIG. 3 is an enlarged detail of the structure shown in FIG. 2.

FIG. 2 shows a view of the cover plate 24 which supports the valve body removed from the balance of the housing as it would be immediately prior to servicing. The right and left sidewalls 32 of the cover plate 24 are each provided with threaded apertures 34 which receive fittings indicated generally at 36. The valve 22 has a number of ports 38 and the valve body is fixed relative to the sidewalls 32. A plurality of standpipes indicated generally at 40 are provided, each standpipe 40 interconnecting an associated port 38 with a conduit 42 in the fitting 36. According to the principles of this invention the exterior portion of the valve body 22 adjacent the port 38 is counterbored to provide a cylindrical recess as can be seen at 44 (illustrated in FIG. 3 wherein a portion of the standpipe has been broken out in the view) and similarly, that end of the fitting which is threaded is also counterbored to provide a cylindrical recess 46. Each end of the standpipe 40 is provided with a groove 48 which receives a pair of O-rings 50. In this connection it should be noted that it is desirable that the counterbores be of the same diameter so that either end of the standpipe can be inserted into the associated counterbore.

According to the method of this invention for establishing a fluid connection, the sidewalls 32 are provided with threaded apertures 34. The valve body is provided with cylindrical recesses in communication with each of its ports 38, the recesses being in generally concentric alignment with the threaded apertures 34 when the valve body is mounted on the cover plate of the housing. A fitting 36 is provided which is threaded at one end, the same end also being provided with a cylindrical recess 46. A standpipe 40 is also provided, the standpipe 40 having O-rings one either end. The ends of the standpipe are so dimensioned that they can be received in the counterbores 44, 46. The standpipes are then inserted into the cylindrical recesses in the valve body 22 and then the fittings 36 are screwed into the threaded apertures 34, and, as they are being screwed into the threaded apertures 34 the other end of the standpipe will be received in the counterbored portion 46 of the fitting 36. The length of each standpipe 40 is such that when the fitting is fully screwed into the aperture 34 until the flange 54 of the fitting 36 contacts the outer wall 56 of the sidewall 32 the standpipe will be almost fully inserted into both of the counterbored portions 44, 46. Finally it is only necessary to connect the terminal end portion 52 of the appropriate fluid line 28 or 30 to the other end of the fitting 36. The housing cover 22 may be associated with the balance of the housing either before or after the connection of the ends of the lines 28, 30 with the associated fittings.

While the threaded aperture 34 should be in generally concentric alignment with the cylindrical recess 44 in the valve body, it should be noted that this construction permits some misalignment of the parts. Thus, in one commercial embodiment, a misalignment of one-tenth of one degree of the standpipe is acceptable.

To disassemble the structure shown in FIG. 2 it is only necessary to disconnect the terminal end portion 52 of each of the fluid lines 28 or 30 from the associated fitting 36 and then to unscrew the fitting from the housing wall 32. When the fitting is removed from the aperture 34 it should be obvious that either one end or the other end of the standpipe will no longer be received in its associated cylindrical recess. To complete the disassembly it is only necessary to pull the standpipe from the other cylindrical recess.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A method for establishing a connection for transmitting fluid under pressure between an opening in a hydraulic unit secured within a housing and a fluid line which terminates outside of said housing; said method comprising the steps of:
    providing a hydraulic fitting terminating in a threaded end and also providing a standpipe;
    forming a first recess with a cylindrical surface in communication with an exterior portion of the opening in the hydraulic unit and also forming a second recess with a cylindrical surface in said one end of the hydraulic fitting;
    forming a threaded aperture in the housing in generally concentric alignment with the recess in the hydraulic unit;
    inserting one end of the standpipe into the recess in the hydraulic unit in a fluid tight relationship with the cylindrical surface of said first recess;
    screwing the threaded end of the fitting into the threaded aperture with the other end of the standpipe being received in the recess of the fitting in a fluid tight relationship with the cylindrical surface of the second recess; and
    securing the fluid line to the other end of the fitting in a fluid tight relationship.

2. The method set forth in claim 1 in which said standpipe is provided with O-rings at either end.

3. A hydraulic connection for establishing a connection for transmitting fluid under pressure between a hydraulic unit and a fluid line, said connection comprising in combination:
    a housing provided with a threaded aperture;
    a hydraulic unit provided with a port, said hydraulic unit being fixed within said housing, and said hydraulic unit being provided with a first recess having a cylindrical surface disposed about said port and in generally concentric alignment with said threaded aperture;
    a fluid line terminating in a fitting, one end of which is threaded into said threaded aperture, and said one end being provided with a second recess having a cylindrical surface; and
    a standpipe one end of which is received within the first recess in fluid tight relationship with the cylindrical surface of said first recess and the other end of which is received within the second recess in fluid tight relationship with the cylindrical surface of the second recess.

4. The hydraulic connection set forth in claim 3 in which the first and second cylindrical recesses are of the same diameter.

5. The hydraulic connection set forth in claim 3 in which said standpipe is provided with O-rings at either end.

6. The hydraulic connection set forth in claim 5 in which said hydraulic unit is a valve body disposed within said housing.

7. A hydraulic connection in combination with a housing provided with a threaded aperture, a fluid line which normally terminates outside of said housing, and a hydraulic unit mounted within the housing; the hydraulic connection including
    a first recess having a cylindrical surface disposed about a port in the hydraulic unit;
    a fitting to which an end of the fluid line is connected in fluid tight relationship, one end of the fitting being threaded into said threaded aperture, the fitting also being provided with a second recess having a cylindrical surface in communication with the fluid line; and
    a standpipe, one end of which is received within the first recess in fluid tight relationship with the cylindrical surface of the first recess and the other end of which is received within the second recess in fluid tight relationship with the cylindrical surface of the second recess; the parts being so arranged and constructed that fluid under pressure may be transmitted between the fluid line and the hydraulic unit through said fitting and said standpipe.

8. The hydraulic connection set forth in claim 7 in which said hydraulic unit is mounted with the first recess in generally concentric alignment with the second recess when the fitting is threaded into said threaded aperture.

* * * * *